UNITED STATES PATENT OFFICE.

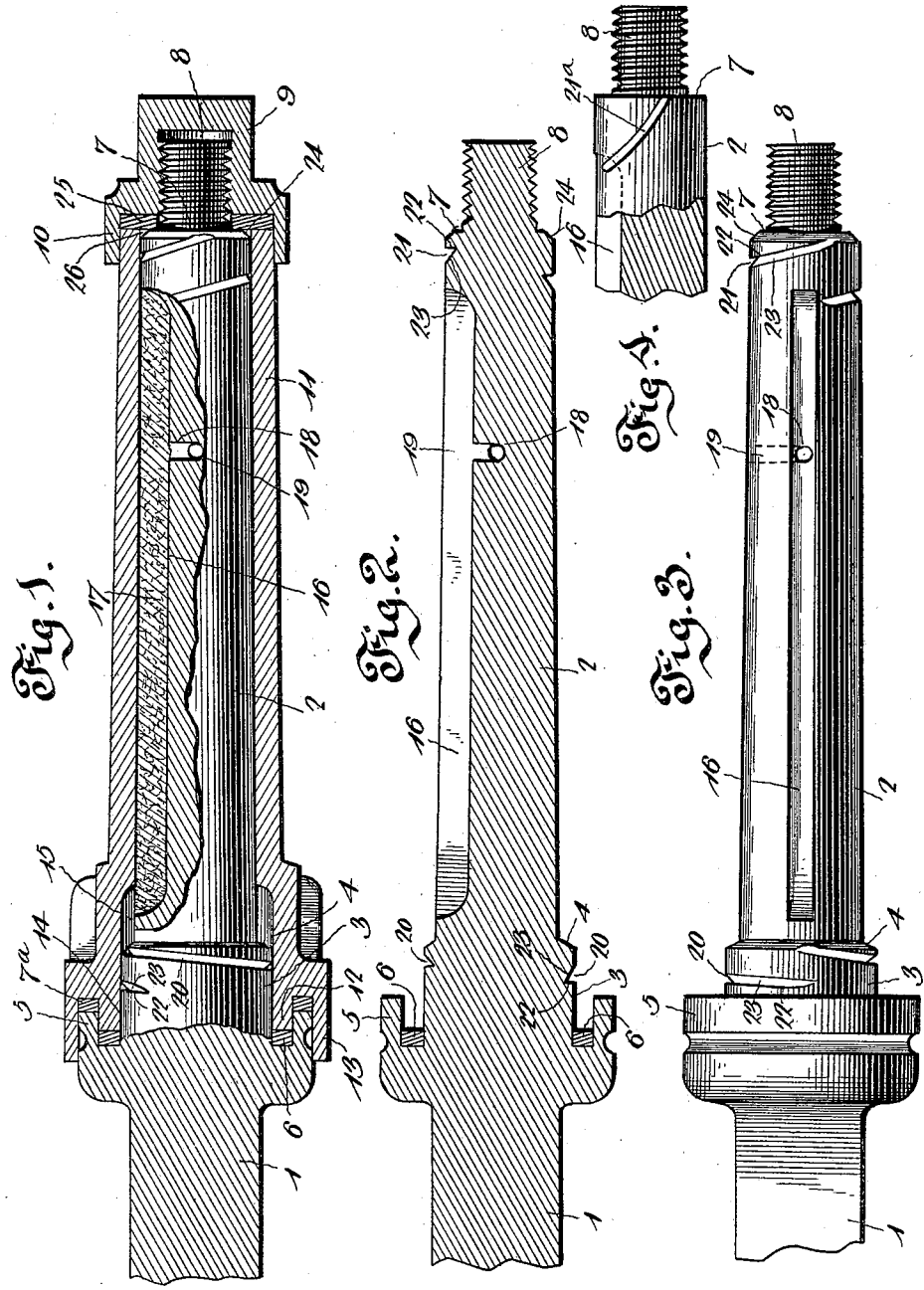

JOHN L. DOLSON, OF CHARLOTTE, MICHIGAN.

SELF-LUBRICATING AXLE.

SPECIFICATION forming part of Letters Patent No. 621,906, dated March 28, 1899.

Application filed September 20, 1898. Serial No. 691,451. (No model.)

*To all whom it may concern:*

Be it known that I, JOHN L. DOLSON, a citizen of the United States, residing at Charlotte, in the county of Eaton and State of Michigan, have invented a new and useful Self-Lubricating Axle, of which the following is a specification.

This invention relates to self-lubricating axles; and it has for its object to effect certain improvements in axles of this character to insure a thorough and constant lubrication of the axle-spindle and axle-box by evenly distributing the lubricant throughout the entire bearing-surfaces of the spindle and box.

The invention has for a special object a novel formation and arrangement of grooves which insure the retention of the oil between the spindle and axle-box when the vehicle is in motion and positively prevent leakage or escape thereof at the ends of the axle-spindle, thereby also assisting in providing a perfectly dust-proof construction.

With these and other objects in view, which will readily appear as the nature of the invention is better understood, the same consists in the novel construction, combination, and arrangement of parts hereinafter more fully described, illustrated, and claimed.

In the drawings, Figure 1 is a longitudinal sectional view of the spindle ends of an axle having the axle box and nut fitted thereto and embodying the improvements contemplated by this invention. Fig. 2 is a similar view with the axle-box removed. Fig. 3 is a plan view of the upper side of the spindle. Fig. 4 is a detail view showing a modification of the axle in which the spiral return-groove at the outer end thereof is used in connection with a plain shoulder instead of with an annularly beveled or chamfered shoulder.

Referring to the accompanying drawings, the numeral 1 designates an axle having a spindle 2 of the usual tapering form. As illustrated in the drawings, the axle-spindle 2 is provided at its inner end with an annular surface collar 3, having a beveled shoulder 4, meeting the exterior surface of the spindle proper and encircled by a supplemental cup-collar 5, also formed integrally with the axle at the inner end of the spindle and having its outwardly-disposed flange $5^a$ lying parallel to and concentric with the surface collar 3, which it partly overhangs. While the overhanging cup-collar 5 at the inner end of the spindle is not claimed in this application, still the improvements forming the present invention are specially designed for use in connection with axle-spindles of that type having the said cup-collar, and the latter is designed to have fitted inside thereof the usual washer 6.

The axle-spindle 2 is provided at its outer end with the flat shoulder 7, from which is projected the usual threaded stem 8 to receive thereon the axle-nut 9, which is provided at its inner side with the cup 10, adapted to fit over the outer end of the axle-box 11, which rotates on the spindle 2 with the vehicle-hub in the usual manner. The said axle-box is provided at its inner end with a pair of inner and outer concentric flanges 12 and 13, which receive therebetween the horizontal flange of the cup-collar 5, said collar working against a packing-washer $7^a$, fitted in the base of the recess between the said concentric flanges 12 and 13, the inner of which flanges 12 works against the washer 6 within the cup-collar. The construction described provides a thoroughly dust-proof connection between the inner end of the spindle and the axle-box, and at this point it will be observed that the axle-box 11 is provided within its inner end with a counterbore 14, receiving the surface collar 3 of the spindle and of a greater length than the exposed portion of said collar, so as to inclose at one side of the shoulder 4 of the collar 3 an annular oil-chamber 15, which is in communication with the inner end of the longitudinal oil-reservoir groove 16, formed in the upper side of the axle-spindle.

The oil-reservoir groove 16, formed in the upper side of the axle spindle or arm 2, extends nearly the entire length thereof between the collar 4 and the shoulder 7, and said groove is preferably designed to receive therein the usual felt distributing-pad 17, which is saturated with lubricant from time to time, it being understood that the reservoir-groove 16 is filled with the lubricant in the usual way to carry the supply thereof for lubricating the axle. The groove 16 is of a substantially uniform depth from end to end and has communicating with the base thereof an oil-channel 18, from which leads a lateral distributing passage or orifice 19, opening through the axle-spindle or arm at the forward side thereof and providing for distributing the oil which naturally settles from the oil-pad 17 to the bottom or base of the said reservoir-groove 16. The oil, which works itself along the axle-spindle or arm toward the inner and outer ends thereof, is prevented from escaping at the extremities of the spindle and is thrown back into the main groove 16 through the medium of the spiral oil-return grooves 20 and 21, arranged, respectively, beyond the opposite terminals of the said groove 16. The oppositely-located spiral return-grooves 20 and 21 are reversely arranged relatively to each other, so that the same forward movement or rotation of the axle-box will work the oil in both grooves in the same direction inward toward the groove 16, and both of said grooves are formed with substantially straight and inclined walls 22 and 23, respectively, the straight walls 22 resisting the tendency of the oil to work out of the same when being carried toward the main groove 16. The spiral return-groove 20 is formed in the exterior of the surface collar 3, and one terminal of said groove leads to the upper side of the spindle adjacent to the inner terminal of the groove 16 and terminates at the shoulder 4 of the collar 3, thereby providing for returning the oil from the inner end of the spindle to a point where it will work into the groove 16 and be redistributed, and it will also be observed that the spiral return-groove 20 opens into the annular oil-chamber 15, formed between the interior shoulder of the axle-box and the contiguous shoulder 4 of the collar 3.

The spiral return-groove 21 is formed in the exterior surface of the spindle or arm 2, at the outer end thereof, and the inner terminal of said groove extends to a point in close proximity to the upper groove 16, at one side thereof and near its outer end, but terminates short of said groove 16. By having the inner end of the spiral groove 21 terminating short of the groove 16 does not interfere with the return of the oil from the groove 21 into the groove 16, while at the same time positively preventing the oil running back from the groove 16 into the spiral groove 21, and thereby possibly causing a leakage of oil. This feature is quite important to the successful operation of the device, and another feature of importance is having the outer end of the spiral groove 21 arranged so as not to come flush with the shoulder 7 of the spindle, but terminating at the chamfered or beveled corner edge 24 of said shoulder 7.

The axle-nut 9 has fitted therein a flat gasket-washer 25, which is held tight by the nut against the shoulder 7, and thereby in a position to cover the space between the spindle and the outer end of the axle-box. In this position the gasket-washer 25, in connection with the chamfered or beveled corner edge 24 of the shoulder 7, closes in an annular oil-channel 26 at the extreme outer edge of the axle-spindle. This channel collects accumulations of oil which work to the outer end of the spindle, and when the axle-box is in motion this oil is carried inward through the return-groove 21 back into the groove 16 for redistribution.

While reference has been made to the fact that it is preferable to chamfer or bevel the corner edge 24 of the shoulder 7, still it will be understood that the invention may be carried out by leaving the shoulder 7 perfectly plain or flat, as illustrated in Fig. 4 of the drawings, and having the spiral return-groove cut through at one end flush with the face of said shoulder. The opposite end of this spiral return-groove, which is designated in Fig. 4 by the number 21ª, extends to a point in close proximity to the upper groove 16, at one side thereof, but terminates short of said groove in the manner and for the purpose previously explained. In this connection it will be further understood that the spiral return-groove 21ª need not necessarily be a complete spiral, but only a section of a spiral, as shown in said Fig. 4 of the drawings, and said groove may also be of any desired shape without materially affecting the operation of the groove in conjunction with the shoulder 7 and the main reservoir-groove 16.

From the foregoing it is thought that the construction, operation, and many advantages of the herein-described self-lubricating axle will be readily apparent to those skilled in the art without further description, and it will be understood that changes in the form, proportion, and the minor details of construction may be resorted to without departing from the principle or sacrificing any of the advantages of this invention.

Having thus described the invention, what is claimed, and desired to be secured by Letters Patent, is—

1. In a self-lubricating axle, the axle-spindle provided in its upper side with a longitudinal reservoir-groove having a distributing-passage communicating therewith, and spiral oil-return grooves arranged reversely with relation to each other respectively beyond the opposite terminals of the reservoir-groove, the terminals of both of said return-grooves, contiguous to the reservoir-groove, terminating short of the latter groove so as not to open directly into the same, and each of said return-grooves being formed with a straight and an inclined wall, the straight walls of the grooves serving to prevent the oil backing out of the same, substantially as set forth.

2. In a self-lubricating axle, the combination of the axle-spindle provided in its upper side with a longitudinal reservoir-groove having a distributing-passage communicating therewith, and at its inner end a surface collar having formed therein a spiral return-groove whose terminal contiguous to the reservoir-groove terminates on the upper side of the spindle at the shoulder of the collar, and the axle-box provided within its inner end with a counterbore receiving the surface collar and forming an interior shoulder, between which and the shoulder of said collar is formed a vacant annular oil-chamber, which overhangs and has exposed therein the inner end of the longitudinal reservoir-groove, substantially as set forth.

3. In a self-lubricating axle, the axle-spindle provided in its upper side with a longitudinal reservoir-groove, having a distributing-passage communicating therewith, said spindle being further provided near its outer end with an annular oil-channel, and with an exterior spiral return-groove leading from said channel to near the reservoir-groove, substantially as set forth.

4. In a self-lubricating axle, the axle-spindle provided in its upper side with a longitudinal reservoir-groove having a distributing-passage, near its outer end with a flat shoulder having a chamfered or beveled edge, and with an exterior spiral return-groove having one terminal terminating at said chamfered or beveled edge and its other terminal terminating short of the reservoir-groove but in close proximity thereto, in combination with the axle-nut carrying a gasket-washer coöperating with said chamfered or beveled edge to form an annular oil-channel, substantially as set forth.

5. In a self-lubricating axle, the axle-spindle provided in its upper side with a longitudinal reservoir-groove, at its outer end with a shoulder, and with an exterior spiral return-groove having one terminal leading to said shoulder and its other terminal extending to a point in close proximity to the reservoir-groove and terminating short thereof, in combination with a gasket-washer held flat against said shoulder and of a greater diameter than the adjacent portion of the spindle, substantially as set forth.

6. In a self-lubricating axle, the axle-spindle provided with a longitudinal reservoir-groove, near its outer end with a flat annular shoulder, and with an exterior spiral return-groove contiguous to the outer end of the reservoir-groove and having one end terminating at said shoulder, in combination with a gasket-washer held flat against such shoulder, and of a greater diameter than the adjacent portion of the spindle, substantially as set forth.

7. In a lubricating-axle, the axle-spindle provided in its upper side with a longitudinal reservoir-groove, and contiguous to the outer end of the reservoir-groove with an exterior spiral return-groove, the inner terminal of said return-groove extending to a point in close proximity to the reservoir-groove at one side thereof, but terminating short of said reservoir-groove to prevent the backflow of oil into the return-groove, substantially as set forth.

8. In a self-lubricating axle, the axle-spindle provided near its outer end with an annular shoulder having a chamfered edge, and an oil-return groove leading inward from said chamfered edge, in combination with a gasket-washer held against the shoulder, substantially as set forth.

In testimony that I claim the foregoing as my own I have hereto affixed my signature in the presence of two witnesses.

JOHN L DOLSON.

Witnesses:
 DWIGHT BACKUS,
 CURTIS W. PARKER.